Aug. 4, 1953  H. TRIEBBNIGG ET AL  2,647,368
METHOD AND APPARATUS FOR INTERNALLY COOLING GAS
TURBINE BLADES WITH AIR, FUEL, AND WATER
Filed May 8, 1950
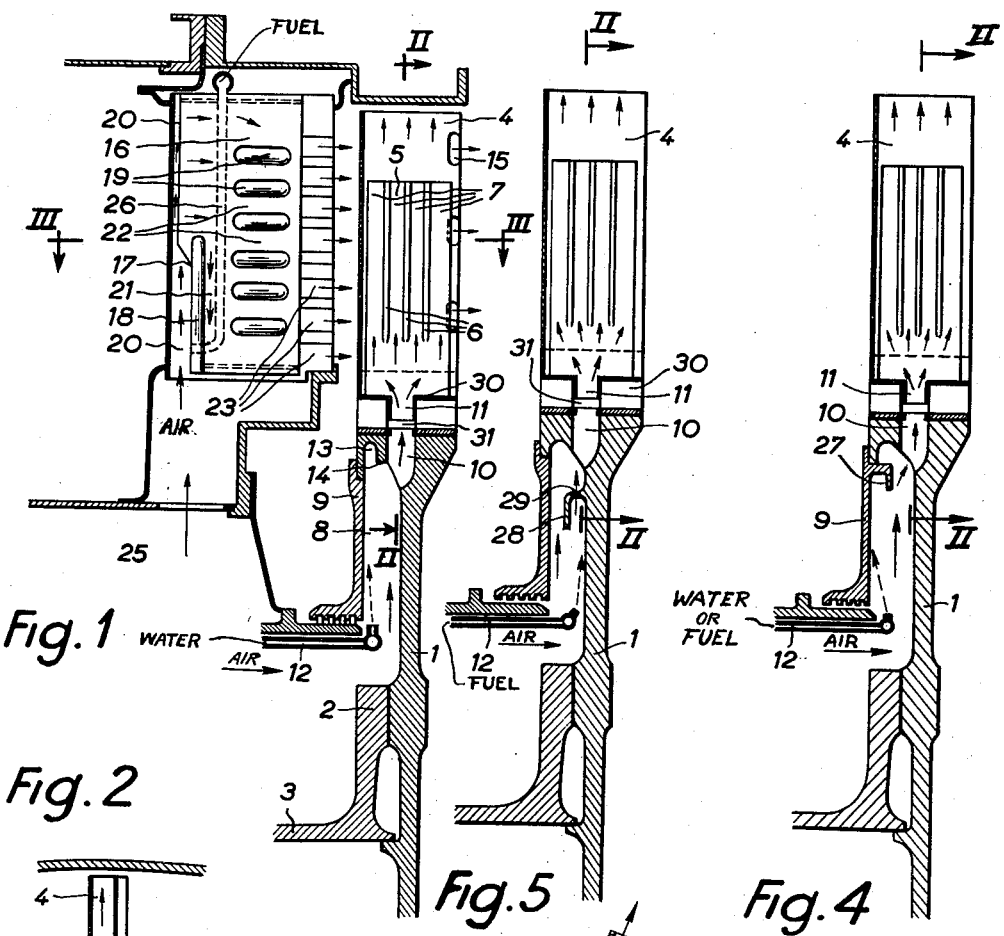
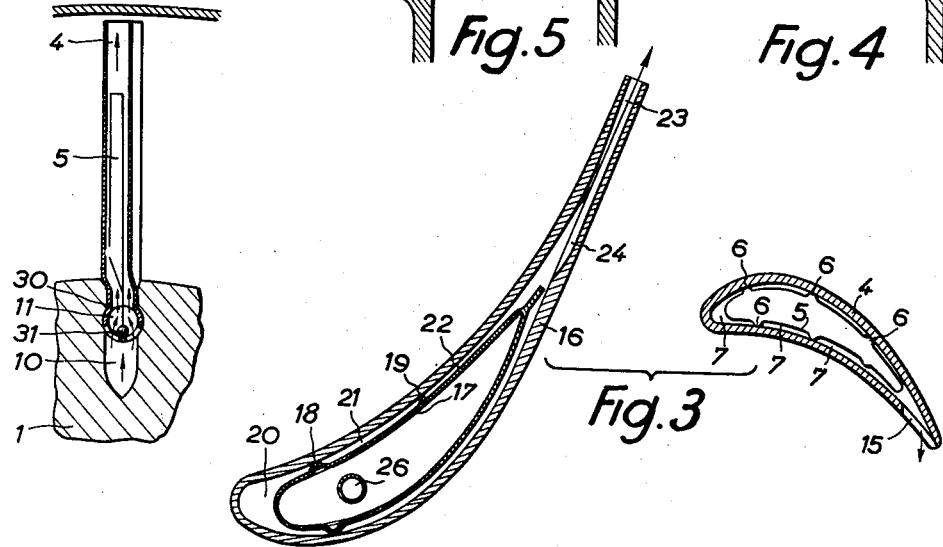

Patented Aug. 4, 1953

2,647,368

UNITED STATES PATENT OFFICE 2,647,368

METHOD AND APPARATUS FOR INTERNALLY COOLING GAS TURBINE BLADES WITH AIR, FUEL, AND WATER

Heinrich Triebbnigg and Otto David, Decize, France, assignors to Hermann Oestrich, Decize, France Application May 8, 1950, Serial No. 160,724
In France May 9, 1949

12 Claims. (Cl. 60—39.05)

This invention relates to gas turbines, and more particularly to gas turbines of the type wherein the turbine blades are cooled by means of a coolant medium, generally air, flowing through recesses in the blades.

In the operation of gas-turbine engines, circumstances often arise in which it becomes necessary or desirable to increase momentarily the power output of the engine above that normally admissible for prolonged operation of the engine. This is especially true of aircraft power-plants, and still more specifically so in the case of turbo-jet aircraft engines, wherein provision for momentarily boosting the power (or thrust) is an essential requisite for desirable flight performance.

The methods of boosting the power of gas-turbines as currently known and used include: (a) Increasing the gas intake temperature to the turbine; (b) Injecting water into the compressor; (c) Injecting water into the combustion chamber; and (d) Post-combustion of the fuel downstream of the turbine, for example, in an after-burner assembly.

Whereas the method (a) possesses maximum advantage, a limitation is quickly reached in its use due to failure of the blade material at high temperatures. The methods (b), (c) and (d), while not subject to this limitation, require more or less complicated additional structure to be included in the turbine and moreover entail a considerable increase in the specific consumption both of water and fuel, a particularly great drawback as far as aircraft-engines are concerned.

It is an object of this invention, accordingly, to boost the power-output of a gas-turbine engine to a higher degree than therefore possible.

Another object is to greatly increase the permissible gas intake temperature into the turbine blading and a related object is to greatly intensify the cooling action on said blading by making use of the existent facilities provided for internally cooling the blades with a flow of cooling air.

With these and further objects in view, my invention provides in the operation of gas-turbines equipped with air-cooled blades, the step of injecting into the cooling air, preferably just before its admisison into the turbine blading, a spray of cooling liquid in atomized form. The cooling liquid may comprise water or fuel, or a mixture of water and fuel (such as a water-methanol mixture).

The cooling liquid is desirably atomized into a spray by the use of the stream of cooling air itself, owing to an appropriate design and arrangement of the cooling-air and liquid ducts.

Where post-combustion is provided for, by an after-burner assembly located downstream of the turbine, the stream of cooling air for the rotor blades preferably has water injected into it, while fuel is injected into the cooling air for the stator or guide blades, said fuel subsequently undergoing post-combustion downstream of the turbine after the discharge of the air-fuel mixture from said guide blades. Conversely, water may be fed into the guide blading cooling air stream and fuel into the rotor blade cooling air stream.

The flow of the coolant fluids to and through the blades is accomplished in the conventional way, radially outwards or inwards, and, within the hollow blades the fluids are caused to flow around appropriate guide vane members. In an illustrative embodiment of the invention, the coolant fluid mixture is deflected in known manner within the blades and it is discharged along the trailing or downstream edge of the blades throughout their axial extent, by means of outlets extending along the direction of flow of the drive fluid.

In the case of a multi-expansion turbine, cooling according to the invention may be applied to all of the stages or only part of the stages, e. g. only to the initial expansion stage.

In addition to the improvements in the operation of a gas-turbine which comprises the improved cooling method hereinabove described, the invention further includes various improvements in the design and construction of gas turbines whereby said method may be efficiently carried into practice, both in existing units and in especially-designed ones.

Some exemplary embodiments of the invention will now be described in detail by way of illustration and not of limitation, and with reference to the accompanying drawing, in which:

Fig. 1 is an axial section of a single-expansion turbine constructed to operate according to the method of the invention;

Fig. 2 is a cross-section on lines II—II of any of the Figures 1, 4 and 5;

Fig. 3 shows cross-sectional views on an enlarged scale of a guide-blade and a rotor blade, taken along the line III—III of Fig. 1.

Figs. 4 and 5 are partial axial sections similar to Fig. 1 but relating to two modifications in the means for supplying the cooling liquid.

In all the figures, the directions of flow of the cooling fluids have been indicated by arrows, the long full-line arrows relating to the flow of air, the long dotted-line arrows relating to the flow of cooling liquid, and the shorter arrows indicating the path of the air-and-liquid spray mixture.

As shown in Figs. 1 and 2, a turbine wheel, identified by the numeral 1, is secured to the flange 2 of a hollow shaft 3 connecting the wheel 1 to a compressor not shown. The rotor blades 4 are shown as secured in sockets or grooves of corresponding shape formed in the rim of the turbine wheel or rotor 1. The blades 4 are hollow and each contains a guiding vane member 5 formed with projections or ribs 6 engaging the inner surface of the blades, thus defining radial ducts 7 for the flow of the cooling fluids; this is more clearly visible in Fig. 3. The cooling air is supplied to each blade 4 from a chamber 8 defined between the wheel 1 and a cover-plate 9 rigidly connected and rotatable with said wheel. The supply of cooling air into the chamber 8 is accomplished in known manner and has not been illustrated. At its discharge from the chamber 8 the cooling air enters into the inner recess of a blade 4 through a corresponding orifice 10 formed in the rim of the wheel and an orifice 11 in the root of each blade. The cooling liquid, preferably water, is supplied through a supply tube 12 and is projected against the inner wall of the cover flange 9, thence flowing radially outwards under centrifugal force, thereby forming a revolving annular body of liquid seated in an annular recess 13 formed in the outer periphery of the rotor and opening radially inward. As the liquid is fed under pressure through the supply pipe 12, the radial depth of this annular body of liquid gradually builds up inwardly, until finally it overflows past an inwardly-directed annular ridge or sill 14 (Fig. 2). At the same time however, the relatively stationary body of air in the chamber 8 sweeps over the sill 14 and entrains the overflowing liquid, atomizing it into a fine spray and drawing this spray into and through the orifices 10 and 11 which are offset relative to the chamber 8 and through the cooling-air ducts in the blades. After having flowed through the blade 4 the air-liquid mixture is discharged out of the rotor wheel 1; while this discharge may be effected radially through the outer end of the blade, it has been shown as accomplished axially in the same direction as the flow of the drive fluid, through outlets 15 formed adjacent to the trailing or downstream edge of the wheel, said outlets being visible in broken lines on the figure. The above-described feeding arrangement which involves setting up and utilizing a revolving liquid annulus ensures that a uniform distribution of the liquid over all the blades is secured.

In the same way as the rotor blades, each of the guide blades 16 is provided with a guiding vane 17 formed with projecting ribs such as 18 and 19 engaging the inner surfaces of the blade walls and defining therewith ducts 20, 21 and 22 of suitable configuration for guiding the cooling air. In the illustrative embodiment shown, discharge ducts 23 are provided by grooves or channels 24 formed in the inner wall of the blade prior to the forming (e. g. bending) of the blade. The cooling air is delivered to an area adjacent to the leading or upstream edge of the blade 16 radially outwards from the chamber 25 which in turn is supplied with cooling air in a conventional way. The cooling liquid, which is preferably a fuel, is brought in from an external source through the pipe 26. This pipe extends through the guide vane 17 and its delivery end lies in immediate vicinity to the narrowest section of the cooling air duct. The desired atomized spray is formed under the effect of the increased velocity of the air stream at this point.

Fig. 3 illustrates with particular clarity the manner in which the coolant fluid ducts are formed within the stator blades by an appropriate cross-sectional configuration of the guide vanes. In accordance with the present invention, the illustrated parts of the turbine are associated with an after-burner (not shown) of conventional construction which is located downstream from the turbine rotor so that the mixtures of fuel, water and air issuing from the blades after cooling the latter and taking up heat from the blades is subjected to a post-combustion in the after-burner for further increasing the developed thrust.

The modification of the invention illustrated in Fig. 4 differs from that shown in Figs. 1 and 2 and described above only by the fact that the chamber in which the revolving annular body of liquid is formed, with its inwardly-directed annular groove for the formation and containment of the revolving liquid annulus and its overflow-sill (respectively designated 13 and 14 in Fig. 1), instead of being machined in the metal of the turbine wheel 1 itself, are provided by a suitably-contoured inwardly-projecting flange 27 formed integrally with the cover flange 9. In other respects the operation is as described above.

In the modification of Fig. 5, this projecting flange, herein designated 28, is formed on the radially-extending portion of the turbine wheel 1, and the jet of liquid is so directed, as indicated by the broken arrow in Fig. 5, as to impinge on said portion of the wheel rather than on the cover flange 9, as in the precedingly described embodiments of the invention. Thus the revolving liquid annulus will form in the annular recess provided by the flange 28. However, in this case, the injection of the spray from this annulus into the blade has been shown as accomplished in a manner somewhat different from that previously described. That is, instead of the coolant liquid overflowing over an annular sill or ridge, it is directly injected through small ports 29 formed in the outer rim of flange 28, at points registering with the orifices 10 and 11, so that, as the centrifugal pressure of the liquid annulus increases in the rotation of the turbine, the liquid will be directly injected through the ports 29 into the root of the blade. To improve the degree of atomization of the spray, baffles may be inserted in the orifices 10—11 against which the jets of cooling fluid will impinge. The cooling air sweeping the baffle will entrain the atomized liquid and enhance the fineness of the spray.

As shown in Fig. 5 for example, the blade is provided with a core member 30 serving as a support for the guide vane 5. The core 30 is reduced in cross section in those areas where it bridges the inlets 10—11, so that the fluid coolant can penetrate into the blade 4 on either side of this reduced portion 31 of the core (see Figs. 1 and 2), and the under face of this reduced portion bridging the inlet orifices 10 and 11 serves the function of the above mentioned baffles to enhance the fineness of the spray.

If a construction is used in which there are more than one inlet orifices in the root of each blade, the remaining material between the apertures can serve as the baffling means for a similar purpose.

The exemplary embodiments illustrated and described show a few particularly simple and efficient arrangements for supplying according to the invention water or another liquid coolant in the form of atomized spray into the cooling air-ducts of an existing type of gas turbine having air-cooled blades, with only a comparatively small increase in the cost of manufacture. It will be understood however that other arrangements could be devised for working the method of the invention, whether in an existent air-cooled turbine or in one especially constructed for the purposes of the invention. While, in the embodiment of Figs. 1, 2 and 3, the rotor and stator blades are respectively cooled by atomized water and fuel, it is to be understood that the rotor blades may be cooled by atomized fuel, for example, by supplying fuel to the conduit 12, as in Fig. 5, and the stator blades may be cooled by atomized water, for example, by substituting water for the fuel flowing through the conduit 26 of Fig. 1.

The power-boosting method of the invention, especially adapted for conditions prevailing in aero-engines, possesses the essential advantage of providing substantial increases in thrust for relatively small increases in the cost of manufacture and fuel consumption. The additional amount of liquid coolant required is extremely low. A further and valuable feature is that the method can be advantageously combined with any of the usual power-boosting methods mentioned in the preamble in paragraphs (b), (c) or (d). Thus for example, it can be easily combined with the post-combustion process as above described, since the high gas temperatures that it is possible to obtain according to the invention will, in the first place, make it possible to omit the special measures that have usually to be taken to provide for post-combustion, and in the second place, reduce the specific fuel consumption of the post-combustion.

What we claim is:

1. In the method of operating a gas-turbine of the type having internally air-cooled ducted blades and an after-burner, the step which comprises feeding into the air-ducts of said blades a cooling mixture consisting of air and an atomized cooling liquid which includes a combustible fuel component so that the cooling mixture issuing from said air ducts may be subjected to post-combustion in the after-burner.

2. In the method of operating a gas-turbine of the type having internally air-cooled ducted blades and an after-burner, the step which comprises feeding a coolant liquid which includes a combustible fuel component into the air stream just prior to its entry into said blade ducts, forming an atomized spray of said liquid with said air, and delivering said spray into and through said blade ducts so that the spray of said liquid and air issuing from said ducts may be subjected to post-combustion in the after-burner.

3. In the method of operating a gas-turbine including a set of stator blades and a set of rotor blades, both of said sets of blades being ducted for the delivery of respective streams of cooling air therethrough, the steps of delivering water into one of said streams and a liquid fuel into the other of said stream, and subjecting the resulting fuel-and-air mixture issuing from the set of blades through which said other stream passes to a post-combustion.

4. In a gas-turbine including a rotor with ducted blades, means defining a sealed enclosure with said rotor radially inwardly of and communicating with said blades, means for delivering a stream of cooling air to said enclosure for passage through said blades, an inwardly-opening annular channel within said enclosure in the path of said air stream, means for delivering into said enclosure a coolant liquid in the radial direction towards said annular channel to create therein, under centrifugal effect, a revolving liquid annulus whereby the air stream in flowing past said liquid annulus will drive liquid particles therefrom for passage through said blades with said stream of cooling air.

5. In a gas-turbine as in claim 4, wherein one side wall of said channel constitutes a side of said enclosure, and the other side of said channel is constituted as a radially-inwardly directed flange over which said revolving liquid annulus is adapted to overflow to be drawn by said air-stream radially outwardly for passage through said blades.

6. In a gas-turbine as in claim 5 wherein the radially outermost wall of said annular channel is formed with restricted ports registering radially with ports opening through the blade roots.

7. In a gas-turbine a rotor having a blade-carrying rim with ducted blades, a radially-extending cover flange rigid with and spaced from said rotor to define therewith a sealed enclosure, orifices through said rim leading from said enclosure into said ducted blades, means for delivering cooling air into said enclosure for passage through said orifices and ducted blades, an inwardly-open annular channel in the inner surface of said rim and an inturned annular flange separating said channel from said orifices and, means for delivering a liquid into said enclosure radially outwardly at a sufficient rate to create and maintain in said channel a revolving annular body of said liquid adapted to overflow over said flange and to be drawn by said cooling air into said orifices.

8. In a gas-turbine a rotor having a blade-carrying rim with ducted blades, a radially-extending cover flange rigid with and spaced from said rotor to define therewith a sealed enclosure, orifices through said rim communicating said enclosure with said blades, means for delivering cooling air into said enclosure for passage through said orifices and ducted blades, an inturned flange projecting from said cover plate into said enclosure defining an inwardly-open annular channel therein radially inward relative to said orifices, and means for delivering liquid into said enclosure radially outwardly towards said channel and at a rate sufficient to create and maintain therein a revolving annular body of said liquid adapted to overflow over said flange and to be drawn by said cooling air into said orifices.

9. In a gas-turbine a rotor having a blade-carrying rim with ducted blades, a radially extending cover flange rigid with and spaced from said rotor to define therewith a sealed enclosure, orifices through said rim communicating said enclosure with said blades, means for delivering cooling air into said enclosure for passage through said orifice and ducted blades, an inturned flange projecting from said rotor into said enclosure defining an inwardly-open annular channel therein, restricted ports in the radially-outer wall of said channel registering radially with said orifices, and means for delivering liquid into said enclosure in the direction radially outwardly towards said channel and at a rate sufficient to create and maintain therein a revolving body of liquid adapted to be expelled by centrifugal pressure through said ports for passage with said cooling air in the form of a spray into said orifices.

10. In a gas-turbine as in claim 9, baffle means in said orifices to improve the degree of atomization of said liquid particles.

11. In a gas-turbine as in claim 9, wherein each blade root is formed with more than one orifice, whereby the intervening solid areas between said orifices serve as baffle means for the liquid spray.

12. In a gas-turbine as in claim 9, a cylindrical core member in each blade root, said core member formed with a reduced portion in the area thereof bridging said orifice, whereby said spray can pass on either side of said reduced portion and the under surface of said portion provides a baffle means improving the atomization of said spray.

HEINRICH TRIEBBNIGG.
OTTO DAVID.

References Cited in the file of this patent

UNITED STATES PATENTS

| Number | Name | Date |
|---|---|---|
| Re. 23,172 | Büchi | Nov. 29, 1949 |
| 1,824,893 | Holzwarth | Sept. 29, 1931 |
| 2,438,998 | Halford | Apr. 6, 1948 |
| 2,468,461 | Price | Apr. 26, 1949 |
| 2,559,131 | Oestrich et al. | July 3, 1951 |
| 2,575,682 | Price | Nov. 20, 1951 |

FOREIGN PATENTS

| Number | Country | Date |
|---|---|---|
| 602,530 | Great Britain | May 28, 1948 |